United States Patent [19]

Nakatsuka et al.

[11] Patent Number: 4,767,516
[45] Date of Patent: Aug. 30, 1988

[54] METHOD FOR MAKING MAGNETIC RECORDING MEDIA

[75] Inventors: Yoshio Nakatsuka, Uji; Minoru Kume, Nara; Daisuke Kishimoto, Hirakata, all of Japan

[73] Assignee: Sanyo Electric Co., Ltd., Osaka, Japan

[21] Appl. No.: 864,357

[22] Filed: May 19, 1986

[30] Foreign Application Priority Data

May 20, 1985 [JP]  Japan .................. 60-107762
Sep. 20, 1985 [JP]  Japan .................. 60-209378
Oct. 3, 1985 [JP]   Japan .................. 60-220770

[51] Int. Cl.$^4$ .................................... C23C 14/36
[52] U.S. Cl. .................. 204/192.14; 204/192.2; 204/192.31; 204/298; 427/131; 427/132
[58] Field of Search .......... 204/192.2, 192.11, 192.12, 204/192.14, 192.31; 427/131, 132

[56] References Cited

U.S. PATENT DOCUMENTS

| | | | |
|---|---|---|---|
| 4,511,594 | 4/1985 | Yanai et al. ............... | 427/38 |
| 4,547,398 | 10/1985 | Sugita et al. .............. | 427/132 |
| 4,567,116 | 1/1986 | Sawada et al. ............. | 428/694 |
| 4,576,700 | 3/1986 | Kadokura et al. ........... | 204/192.2 |
| 4,622,271 | 11/1986 | Arai et al. ................ | 428/615 |
| 4,663,193 | 5/1987 | Endo ....................... | 427/129 |

Primary Examiner—John F. Niebling
Assistant Examiner—William T. Leader
Attorney, Agent, or Firm—Armstrong, Nikaido, Marmelstein & Kubovcik

[57] ABSTRACT

A magnetic recording tape making process and apparatus is disclosed. The apparatus includes a first depositing station which utilizes a the sputtering process for depositing a seed layer on a substrate with an initial incident angle of about 5°, and a second depositing station for depositing, over the seed layer, an extended layer with an initial incident angle of about 45°. The seed layer has a thickness of about 0.01 micrometer, and is defined by young crystalline columns of magnetic material densely and perpendicularly formed on the substrate. The extended layer is defined by extended crystalline columns over the young crystalline columns through self-epitaxial growth. The completed magnetic film defined by the two layers has a high residual magnetization ratio MV/MH and also a high perpendicular coercivity Hcv.

16 Claims, 8 Drawing Sheets

METHOD FOR MAKING MAGNETIC RECORDING MEDIA

BACKGROUND OF THE INVENTION

1. Field of the invention

The present invention relates to the method and apparatus for making magnetic recording media, such as perpendicular magnetic recording tapes, and, more particularly, to the method and apparatus suitable for the mass production of the magnetic recording media.

2. Description of the Prior Art

Figure 1:
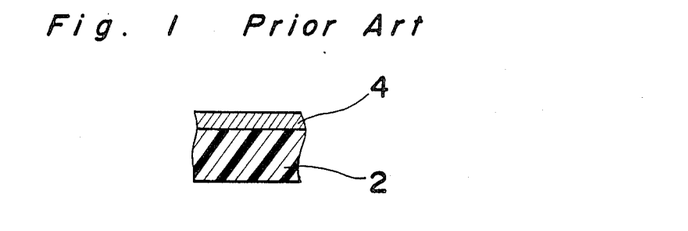
FIG. 1 is a cross-sectional view of a magnetic recording tape formed by the prior art method.

As shown in FIG. 1, a magnetic recording medium, such as a magnetic tape, generally comprises a substrate 2 made of a non-magnetic material and a magnetic layer 4 made of magnetic material deposited on substrate 2.

For high density recording, it is preferable to make layer 4 with a ferromagnetic thin film, such as Co, Ni, Fe and their alloys or oxides which have a merit in providing a high residual flux density.

In a case that the magnetic thin film has a tendency to be magnetized in a direction perpendicular to the face of the base (perpendicular magnetic anisotropy), still higher density recording can be achieved. Such a magnetic recording medium is referred to as a perpendicular magnetic recording medium, which is made of Co-Cr, Co-Cr-Rh, etc.

Generally, perpendicular magnetic recording media are produced by the method of sputtering, vacuum deposition, or ion plating, which are generally called a dry deposition process.

In the sputtering method, a magnetic film, e.g., a Co-Cr film is deposited by the step of sputtering on a base tape made of a non-magnetic material, such as PET (polyethylene terephthalate), polyamide, or polyimide plastic film. To proceed the sputtering process at a high speed, various sputtering methods are proposed, such as a Targets Facing Type, or a magnetron type, which are disclosed in detail in a Japanese Article "New sputtering methods for forming films" by M. Naoe which is introduced in a magazine published by the Institute of Applied Physics of Japan (Vol 48, No. 6).

Figure 2:
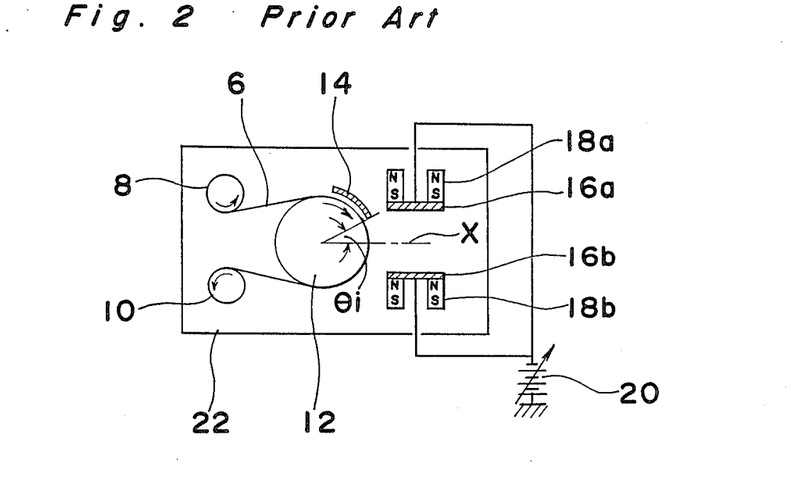
FIG. 2 is a diagrammatic view of a prior art apparatus for making magnetic recording tapes through the Targets Facing Type of Sputtering system.

In FIG. 2, an example of a prior art apparatus for making magnetic recording tapes through the Targets Facing Type of Sputtering system is shown. The apparatus has an air tight chamber 22 into which argon gas is introduced. A substrate, such as a plastic tape 6 is wound on supply reel 8 and take-up reel 10, and a tape portion extending between reels 8 and 10 is stretched around a can roller 12. When a high negative voltage from a source 20 is applied to targets 16a and 16b, each formed by, e.g., Co-Cr alloy plate, argon gas is ionized to produce a plasma discharge, which is confined between target 16a and target 16b by the magnets 18a and 18b coupled to targets 16a and 16b. When the positively charged ionized argon strikes on the target, particles of Co-Cr alloy eject from the target by sputtering and impinge on the tape surface where the tape portion is facing the targets.

The tape slowly moves in the direction indicated by an arrow, and a shield, or a can mask, 14 is provided closely adjacent can roller 12 at the upstream side of the tape movement at an angle $\theta i$ with respect to an axis X extending from the center of can roller 12 and the center of the targets. The larger the angle $\theta i$, the more the amount of particles obliquely deposited from target 16b at the edge of the shield 14, which can be assumed to result in a great change of the film properties. Thus, the angle $\theta i$ is one of the important parameters which affect the properties of the deposited films. The angle $\theta i$ is referred to as an initial incident angle for convenience. Thereafter, no matter what the incident angle is, the following particles, deposited over the first particle, will build up a crystalline column of Co-Cr at the angle $\theta i$ with respect to the normal to the plane of the tape. Thus, in order to build up the crystalline column of Co-Cr as close as possible to the surface normal of the tape, it is preferable to move or widen the shield 14 to make the angle $\theta i$ as close as possible to zero.

However, if shield 14 is widened to make the angle $\theta i$ equal to or close to zero, the deposition effecting distance becomes short, requiring a slow speed advance of the tape to enable the growth of the Co-Cr crystalline columns to the required height, or otherwise, the Co-Cr crystalline layer, defined by the densely packed Co-Cr crystalline columns, will not have a required thickness.

Magnetic tapes manufactured by the method of sputtering with a small initial incident angle $\theta i$ is superior in the point that the deposited magnetic film has a high quality, but it takes disadvantage in that the deposition speed is still very slow, even when the above-mentioned Targets Facing Type or magnetron type is employed, particularly when it is compared with the sputtering with a wide initial incident angle $\theta i$, or with other dry deposition processes, such as vacuum deposition or ion plating.

Figure 3:
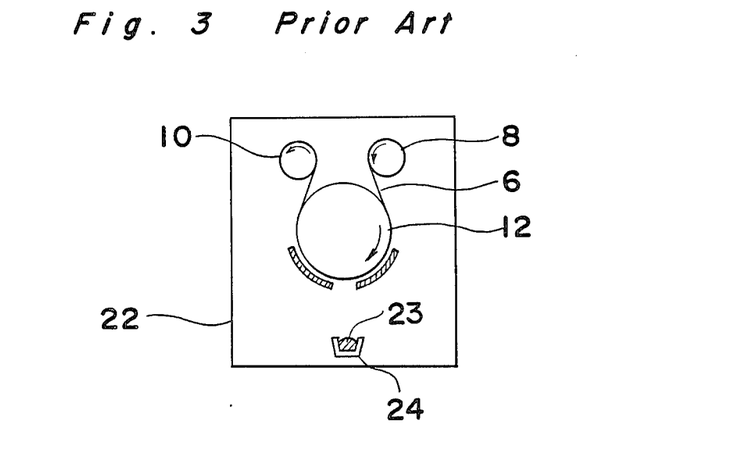
FIG. 3 is a diagrammatic view of a prior art apparatus for making magnetic recording tapes through the vacuum deposition system.

In FIG. 3, an example of a prior art apparatus for making magnetic recording tapes through the vacuum deposition system is shown, and is disclosed, e.g., in an article "Co-Cr Perpendicular Magnetic Recording Tape by Vacuum Deposition" by R. Sugita, given in IEEE Transactions on Magnetics, Vol. MAG-20, No. 5, September 1984, pp 687-692. The apparatus has an air tight chamber 22 in which a Co-Cr alloy ingot 23 contained in a plate 24 is provided. The ingot is heated by a suitable heating means, such as an electronic beam, so as to evaporate the Co-Cr alloy, The Co-Cr vapor is deposited on the substrate tape 6 stretched around can roller 12. The shields provided closely adjacent can roller 12 restrict the incident angle of the vaporized Co-Cr particle impinging on the substrate tape 6.

Magnetic tapes manufactured by the method of vacuum deposition is superior in the point that the deposition speed is fast, but the deposited magnetic film has a poor quality. Also, since the temperature of the substrate tape must be heated up to a quite high temperature, such as 300° C., the substrate tapes which are widely used, e.g., PET tapes can not be used. Instead, it is necessary to use a heat-resistant tape, such as polyamide or polyimide tapes which are usually very expensive. The same can be said to the tape formed by the ion plating system.

Thus, the problem in the prior art method or apparatus for making the magnetic recording media, such as perpendicular magnetic recording tapes, is in the difficulty in making high quality magnetic recording media at high manufacturing speed.

SUMMARY OF THE INVENTION

The present invention has been developed with a view to substantially solving the above described problem and has for its essential object to provide an improved method and apparatus for making high quality magnetic recording media at high manufacturing speed.

In accomplishing these and other objects, the method for making high quality magnetic recording media at high manufacturing speed, according to the present invention, comprises a first step for making a seed layer defined by young crystalline columns of magnetic material densely and perpendicularly formed on a substrate, and a second step for making extended layer defined by extended crystalline columns over the young crystalline columns through the self-epitaxial growth.

The seed layer, which is very thin, such as in the order of 0.01 micrometer, is formed by the method of sputtering with the initial incident angle $\theta i$ being relatively small so as to make the residual magnetization ratio MV/MH (a ratio of the residual magnetization observed in the direction normal to the plane of the substrate to that observed in the direction parallel to the plane of the substrate) greater than 0.8. Accordingly, in the first step, the young crystalline columns are formed on the substrate slowly, but as nearly as perpendicular to the plane of the substrate.

The extended layer is formed on top of the seed layer so as to extend each young crystalline column by the self-epitaxial growth. Since each crystalline column has a tendency to grow in the same direction as the crystalline column initially formed on the substrate, the particles or atoms of the magnetic material can be applied, in the second step, with less consideration of the initial incident angle $\theta i$. Thus, the second step may be carried out by the method of a dry deposition process in which the deposition of the magnetic material is carried out at a rate faster than that for the first step.

Thus, by the method of the present invention, the magnetic recording media can be manufactured at a high speed, and yet maintaining the high quality of the deposited magnetic film.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 7b is a microscopic perspective view of tape section of FIG. 7a;

DESCRIPTION OF THE PREFERRED EMBODIMENTS

First Embodiment

The first embodiment of the present invention will be described in connection with FIGS. 4–10.

First, the description is directed to the experiments carried out by the present inventors to introduce the basic idea of the first embodiment.

Experiment 1

A relationship between the initial incident angle $\theta i$ and the residual magnetization ratio MV/MH (a ratio of the residual magnetization observed in the direction normal to the plane of the substrate to that observed in the direction parallel to the plane of the substrate) of the Co-Cr film deposited on the polyimide substrate through the Targets Facing Type of Sputtering system of FIG. 2 is obtained through Experiment 1. The result of Experiment 1 is shown in a graph of FIG. 4 in which abscissa and ordinate represent, respectively, initial incident angle $\theta i$ and the residual magnetization ratio MV/MH of the Co-Cr film having a thickness of 0.3 micrometer.

Figure 4:
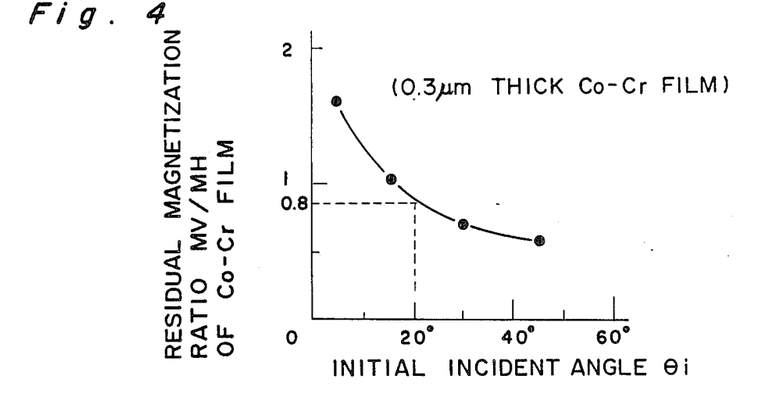
FIG. 4 is a graph showing a relationship between the residual magnetization ratio MV/MH of Co-Cr film formed by any known Target Facting Type of Sputtering and the initial incident angle $\theta i$.

As apparent from the graph of FIG. 4, generally, the residual magnetization ratio MV/MH increases as the initial incident angle $\theta i$ becomes narrower. It is preferable to make the residual magnetization ratio MV/MH greater than 0.8, and from this viewpoint, the initial incident angle $\theta i$ should be about 20° or narrower. The reason why the residual magnetization ratio MV/MH should preferably be greater than 0.8 will be described hereinbelow.

Figure 5:
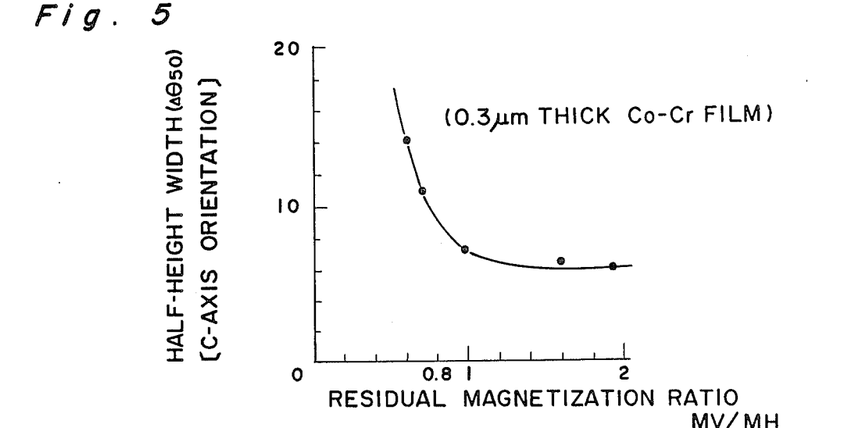
FIG. 5 is a graph showing a relationship between the half-height width $\Delta\theta_{50}$ and the residual magnetization ratio MV/MH.

The Co-Cr film is defined by a plurality of crystalline columns standing parallel to each other on the substrate, each crystalline column having an hcp crystallographic structure with its c-axis orientation being perpendicular to the film plane. Since it is known in the art that the degree of the c-axis orientation can be evaluated by the half-height width ($\Delta\theta_{50}$) of an hcp rocking curve as obtained by the x-ray diffraction such that smaller the half-height width ($\Delta\theta_{50}$), greater or superior the c-axis orientation, a relationship between the half-height width ($\Delta\theta_{50}$) and the residual magnetization ratio MV/MH is obtained, as shown in FIG. 5, so as to find the low limit of the residual magnetization ratio MV/MH with respect to the c-axis orientation. Since the half-height width ($\Delta\theta_{50}$) is dependent on the thickness of the Co-Cr film, 0.3 micrometer thick Co-Cr film is employed as an example.

As apparent from FIG. 5, the half-height width ($\Delta\theta_{50}$) increases abruptly when the residual magnetization ratio MV/MH becomes smaller than 0.8. In other words, If the residual magnetization ratio MV/MH is about 0.8 or greater, a 0.3 micrometer thick Co-Cr film having a preferred amount of the c-axis orientation can be obtained.

Experiment 2

Figure 6:
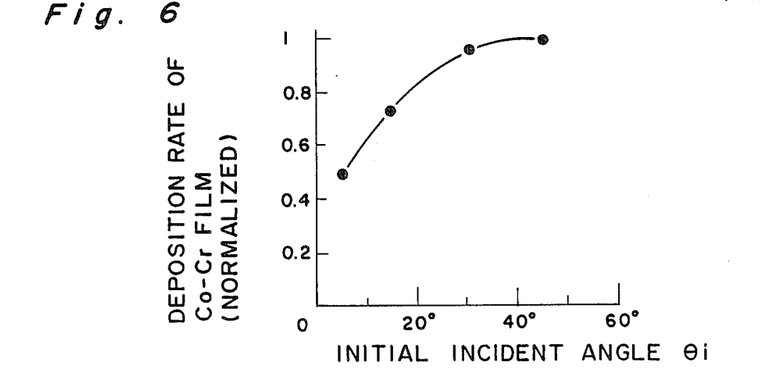
FIG. 6 is a graph showing a relationship between the deposition rate of Co-Cr film and the initial incident angle $\theta i$.
Figure 7A:
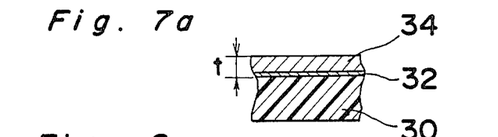
FIG. 7a is a cross-sectional view of a magnetic recording tape formed by the method according to the present invention.
Figure 7B:
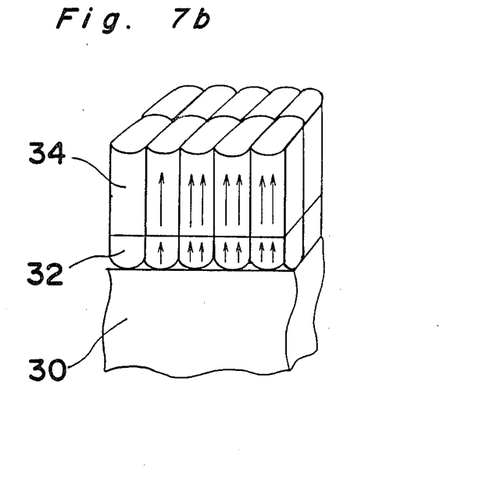

A relationship between the initial incident angle $\theta i$ and the deposition rate (a rate of deposition of the Co-Cr particles on the substrate) of the Co-Cr film deposited on the polyimide substrate through the Targets Facing Type of Sputtering system of FIG. 2 is obtained through Experiment 2. The result of Experiment 2 is shown in FIG. 6 in which the deposition rate is normalized by taking the deposition rate at the initial incident angle $\theta i$ of 45° as 1. In the case of the apparatus shown in FIG. 2, when shield 14 is so moved as to provide the initial incident angle $\theta i$ of 45°, the shield will not hinder the advance of the Co-Cr particles directed to the film. Thus, the positioning of shield 14 to provide the initial incident angle $\theta i$ of 45° is substantially equal to the case when the shield is removed.

If the residual magnetization ratio MV/MH is selected to be 1.5, it can be understood from the graph of FIG. 4 that the initial incident angle $\theta i$ should be about 5°. In such a case, the deposition rate will drop to about 0.5, resulting in the very slow deposition rate.

As apparent from Experiments 1 and 2, when the shield is so turned as to provide a small initial incident angle $\theta i$, a Co-Cr film having an excellent c-axis orientation can be produced, but the manufacturing speed will be very slow.

Fundamental Idea of the First Embodiment

Based on the above experiments, it has been brought up to the minds of the present inventors that in the process for depositing the Co-Cr film on the polyimide substrate through the Targets Facing Type of Sputtering system, the Co-Cr film may be made in two steps so as to make a Co-Cr film having an excellent c-axis orientation and yet improving the manufacturing speed. As diagrammatically shown in FIGS. 7a and 7b, in the first step, a seed layer 32, defined by young Co-Cr crystalline columns densely and perpendicularly formed on a substrate 30 made of polyamide film, may be formed with a narrow initial incident angle $\theta i(a)$. Then, in the second step, an extended layer 34, defined by extended crystalline columns over the young crystalline columns, may be formed through the self-epitaxial growth with a wide initial incident angle $\theta i(b)$. Seed layer 32 and extended layer 34 taken together define a Co-Cr film to be deposited on the substrate.

Figure 8:
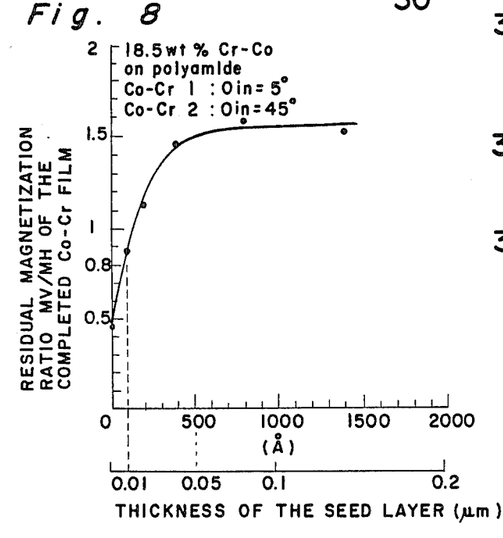
FIG. 8 is a graph showing a relationship between the residual magnetization ratio MV/MH of the Co-Cr film and the thickness of the seed layer.

In the above case when the initial incident angles $\theta i(a)$ and $\theta i(b)$ are selected to be 5° and 45°, respectively, and the thickness of the Co-Cr film is 0.3 micrometers, the seed layer 32 should have the thickness at least about 0.01 micrometer so as to present the residual magnetization ratio MV/MH of the finally produced Co-Cr film as being about 0.8 or greater. This is determined by the test for obtaining a relationship between the thickness of the seed layer and the residual magnetization ratio MV/MH of the 0.3 micrometer thick Co-Cr film, the result of which is shown in FIG. 8. As apparent from the graph of FIG. 8, the residual magnetization ratio MV/MH of the 0.3 micrometer thick Co-Cr film showed 0.8 when the thickness of the seed layer was 0.01 micrometer. The ratio MV/MH increases rapidly and becomes stable at about 1.5, that is when the seed layer becomes thicker than 0.05 micrometer.

By the above described method, it is possible to deposit a Co-Cr film which has a required level of the residual magnetization ratio MV/MH, and yet improving the manufacturing speed.

Apparatus of the First Embodiment

Figure 9:
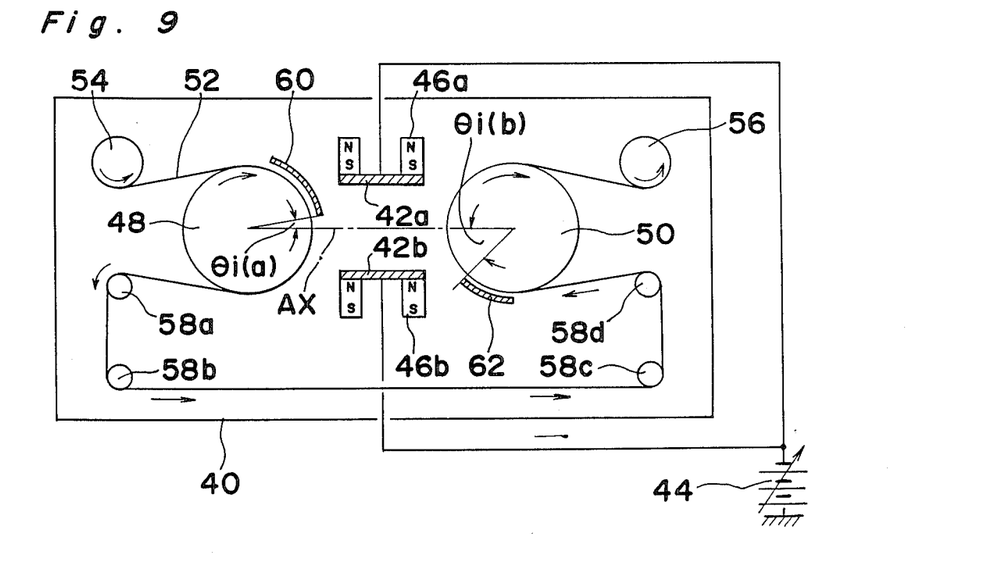
FIG. 9 is a diagrammatic view of an apparatus for making magnetic recording tapes through the Targets Facing Type of Sputtering system, according to a first embodiment of the present invention.

Referring to FIG. 9, an apparatus for making magnetic recording media according to the first embodiment is shown, which is a Targets Facing Type. The apparatus comprises an air tight chamber 40 in which a pair of targets 42a and 42b, each formed by, e.g., Co-Cr alloy plate, are provided at the center of the chamber. Targets 42a and 42b are positioned facing parallel to each other with a predetermined spacing therebetween, and are connected to a battery 44, and coupled with permanent magnets 46a and 46b, respectively, as shown in FIG. 9. It is to be noted that targets 42a and 42b and the associated parts (such as 44, 46a, 46b) thereof define an atomic-particles generating means for generating particles of magnetic material for being deposited on the substrate.

Can rollers 48 and 50 are located on the opposite sides of the atomic-particles generating means such that a line between the centers of can rollers 48 and 50 coincides with an axis AX of the atomic-particles generating means extending at the center between targets 42a and 42b.

A substrate, such as a plastic tape 52, is wound on a supply reel 54 and extends to a take-up reel 56. A tape portion between reels 54 and 56 extends around can roller 48, guide rollers 58a, 58b, 58c and 58d and can roller 50. By a suitable driving means (not shown), the substrate tape moves from supply reel 54 to take-up reel 56.

A shield, or a can mask, 60 is provided closely adjacent can roller 48 at the upstream side of the tape movement at an angle θi(a) with respect to the axis AX. Similarly, a shield 62 is provided closely adjacent can roller 50 at the upstream side of the tape movement at an angle θi(b) with respect to axis AX. In the embodiment shown, angles θi(a) and θi(b) are 5° and 45°, respectively. Can roller 48 and shield 60 define a first depositing station where the seed layer 32 is formed, and can roller 50 and shield 62 define a second depositing station where the extended layer 34 is formed.

In operation, first, the pressure inside chamber 40 is pumped down to $1 \times 10^{-6}$ Torr, and thereafter, argon gas is introduced into chamber through a port (not shown) until the pressure inside the chamber increases to $2 \times 10^{-3}$ Torr. Then, can rollers 48 and 50 are heated, by a suitable heating means to 120° C. An example of the heating means will be described later in connection with FIG. 15. Substrate 52 is advanced at a speed 60 cm/min, and the applied sputtering power density is 38 W/cm$^2$.

When a high negative voltage from source 44 is applied to targets 42a and 42b, each formed by, e.g., Co-Cr alloy plate, argon gas is ionized to produce a plasma discharge, which is confined between targets 42a and 42b by the magnets 46b and 46a. When the positively charged ionized argon strikes on the target, atomic particles of Co-Cr alloy eject from the target and are directed in the opposite directions towards the first and second depositing stations.

At the first depositing station, the atomic particles impinge on the tape surface with the initial incident angle θi(a) of 5°, thereby effecting the deposition with a small half-height width ($\Delta\theta_{50}$). Thus, the sputtering process in the first deposition station is effected such that the atoms are incident to the bombarded surface in the direction parallel to the surface normal, resulting in the formation of the young or seed crystalline columns in the direction parallel to the surface normal. The atoms bombarded after the formation of the seed crystalline columns will be used to grow the crystalline columns in the direction parallel to the surface normal, even if the later bombarded atoms are incident on the surface at oblique angles. Thus, in the apparatus shown in FIG. 9, no shield is provided on the downstream side of the tape with respect to the axis AX.

When the tape is moved to the second depositing station, the atomic particles impinge on the tape surface with the initial incident angle θi(b) of 45°, thereby enabling the deposition for a long period of time. Thus, in the second depositing station, extended layer 34 is formed. Since the seed layer is formed by the crystalline columns which erect parallel to the surface normal, the extended part of the crystalline columns as formed in the second depositing station will also grow parallel to the surface normal, despite that some bombarded atoms are incident on the surface at oblique angles.

According to the present invention, high quality magnetic recording media, such as perpendicular magnetic recording tapes having a small half-height width ($\Delta\theta_{50}$), can be made at high manufacturing speed.

Figure 10:
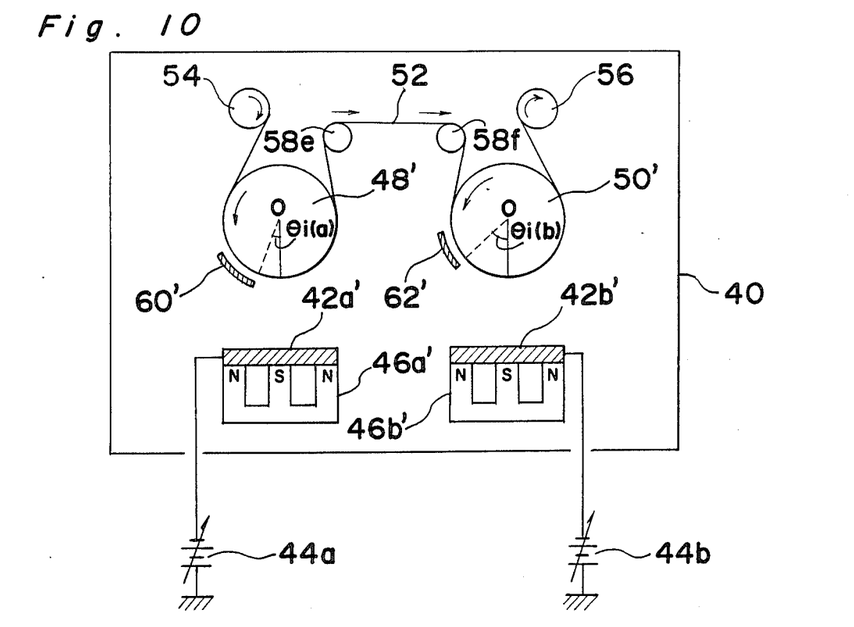
FIG. 10 is a diagrammatic view of an apparatus which is a modification of the apparatus shown in FIG. 9.

Referring to FIG. 10, a modification of the first embodiment is shown, in which, instead of the Targets Facing Type, the magnetron type sputtering is employed. In the apparatus shown, the atomic particles generating means is defined by targets 42a' and 42b' provided separately inside the chamber. The targets are coupled, respectively, with permanent magnets 46a' and 46b' for effecting the magnetron discharge, and are connected to the power source. Can rollers 60' and 62' are located at positions facing the targets. In the apparatus of FIG. 10, the sputtering is effected in a similar manner as described above.

Second Embodiment

The second embodiment of the present invention will be described in connection with FIGS. 11–15.

First, the description is directed to the background and the experiments carried out by the present inventors to introduce the basic idea of the second embodiment.

Background

It is known in the art that the temperature of the substrate has a great influence on the manufactured magnetic tape such that while the magnetic film is being deposited on the substrate, the substrate should be maintained at a high temperature so as to make the coercivity of the magnetic recording media high. If the temperature of the substrate is maintained high, there is a counteraction such that the substrate will be damaged, e.g., wrinkled, particularly when the substrate is made of a plastic film having a low heat resistance, such as a PET film. To avoid such a disadvantage, it is possible to use a substrate made of a high heat resistance material, but this will result in high manufacturing cost.

Since the method and apparatus for making the magnetic recording media, according to the present invention, has the first step (or station) to form the seed layer and the second step (or station) to form the extended layer, it is possible to hold the substrate at different temperatures between the two steps so as to control the temperature of the substrate in a more precise manner than the prior art method or apparatus.

Experiment 3

A relationship between the temperature of the substrate and the perpendicular coercivity Hcv of the Co-Cr film deposited on the polyimide substrate through the Targets Facing Type of Sputtering system of FIG. 2 is obtained through Experiment 3. The result of Experiment 3 is shown in a graph of FIG. 11.

Figure 11:
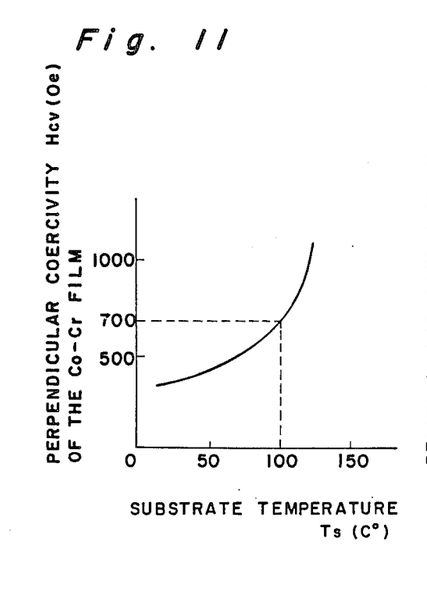
FIG. 11 is a graph showing a relationship between the perpendicular coercivity Hcv of the Co-Cr film and the temperature of the substrate.
Figure 12:
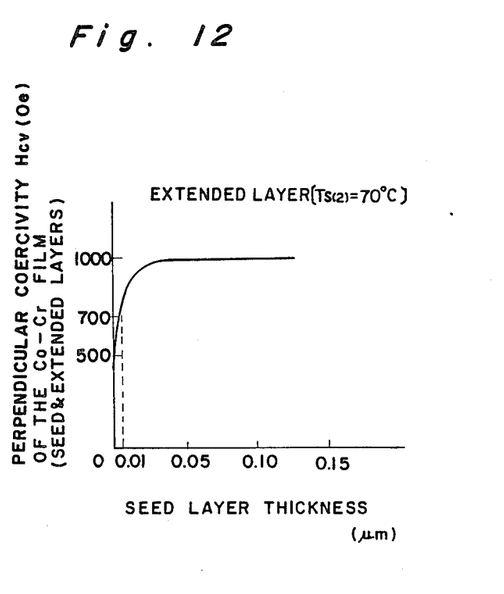
FIG. 12 is a graph showing a relationship between the perpendicular coercivity Hcv of the Co-Cr film and the thickness of the seed layer.

As apparent from FIG. 11, generally, the perpendicular coercivity Hcv of the Co-Cr film increases as the increase of the temperature of the substrate. In the case where the magnetic recording is carried out under the perpendicular magnetization using the ring head, it is necessary to have the perpendicular coercivity Hcv almost equal to or greater than 700 oersted, and preferably about 1000 oersted. Thus, from this viewpoint, the graph of FIG. 11 shows that the temperature of the substrate should be greater than about 100° C., and preferably about 110–120° C.

Also, from another test, it has been found that it is necessary to maintain the substrate temperature below 70° C. during the forming process of a 0.3 micrometer thick Co-Cr film on the substrate tape made of PET without resulting in any wrinkle of the substrate.

Fundamental Idea of the Second Embodiment

According to the second embodiment of the present invention, in the first step, the seed layer is formed with the substrate temperature Ts(1) which is enough high to obtain a required level of the perpendicular coercivity Hcv, and in the second step, the extended layer is formed, over the seed layer by the self-epitaxial growth, with the substrate temperature Ts(2) lower than temperature Ts(1) so as to prevent the substrate from being wrinkled by the heat.

In the second embodiment, temperature Ts(1) is set between 100° C. and 120° C. in the first step to form the seed layer having a required level of the perpendicular coercivity Hcv. It has been found that the substrate will not be damaged during the sputtering of the seed layer at the temperature 100°–120° C., because the seed layer is so thin that the substrate receives the high energy atoms only for a short period of time which is not sufficient to damage the substrate made of a low heat resistance material.

In the second step to form the extended layer, temperature Ts(2) is maintained below 70° C. from a viewpoint of preventing the the substrate from being wrinkled, and from a viewpoint of maintaining the Co-Cr film with a required level of the perpendicular coercivity Hcv, temperature Ts(2) should be maintained above 40° C. Also, the thickness of the seed layer should be greater than 0.01 micrometer. The limit for the seed layer thickness and the temperature limit in the second step are determined by the tests discussed below.

In the first test, the limit for the seed layer thickness is determined. Temperatures Ts(1) and Ts(2) are set at 120° C. and 70° C., respectively, and the thickness of the completed Co-Cr film is made equal to about 0.3 micrometer. When the thickness of the seed layer is varied, but the total thickness of the Co-Cr film is maintained at 0.3 micrometer, it has been found that the perpendicular coercivity Hcv of the Co-Cr film showed 700 oersted or greater when the seed layer thickness is equal to about 0.01 micrometer or greater, as understood from the graph of FIG. 12. Therefore, the seed layer must be thicker than about 0.01 micrometer.

Figure 13:
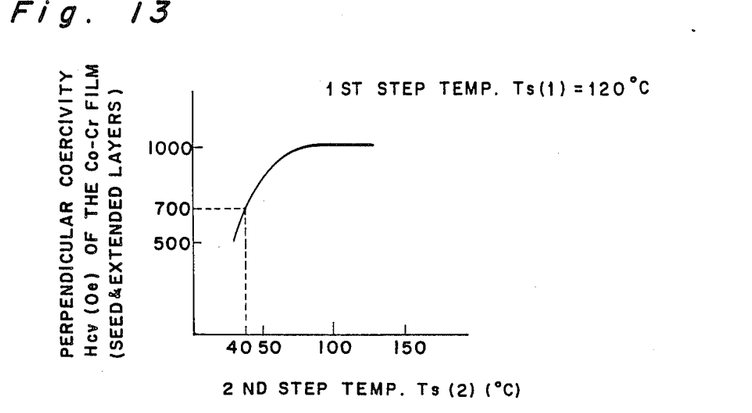
FIG. 13 is a graph showing a relationship between the perpendicular coercivity Hcv of the Co-Cr film and the temperature of the film in the second step.

In the second test, the low boundary temperature limit for effecting the sputtering deposition in forming the extended layer in the second step is determined. Temperature Ts(1) is set at 120° C., and the thickness of the completed Co-Cr film is made equal to about 0.3 micrometer. With the thickness of the seed layer being about 0.02 micrometer, as the temperature in the second step increases, the perpendicular coercivity Hcv of the Co-Cr film increases, as illustrated in FIG. 13. To obtain the perpendicular coercivity Hcv of the Co-Cr film greater than 700 oersted, the temperature Ts(2) in the second step should be greater than 40° C. The upper boundary temperature limit for effecting the sputtering deposition is 70° C. so as to prevent the plastic film from being damaged.

For example, when the temperatures Ts(1) and Ts(2) are set at 120° C. and 70° C., respectively, and the thickness of the completed Co-Cr film is made equal to about 0.3 micrometer with the seed layer being about 0.02 micrometer, it has been observed that the perpendicular coercivity Hcv of the Co-Cr film showed 1000 oersted.

Apparatus of the Second Embodiment

Figure 14:
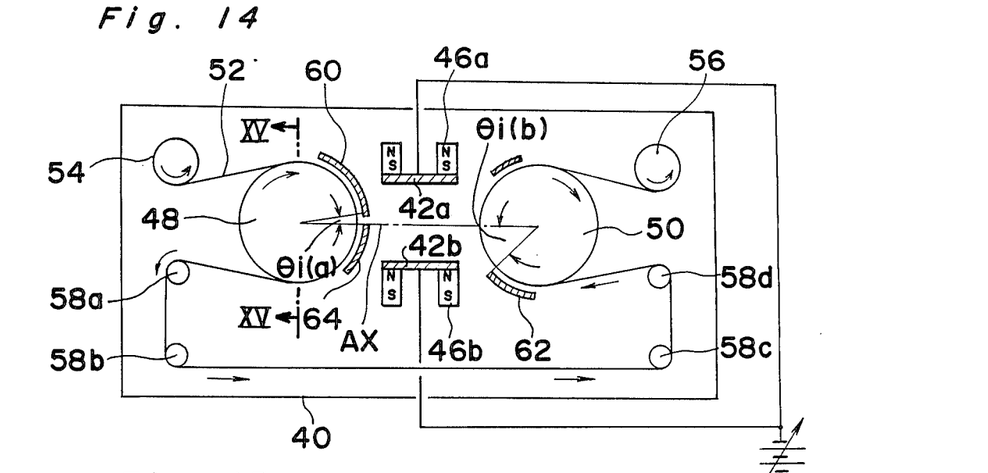
FIG. 14 is a diagrammatic view of an apparatus for making magnetic recording tapes through the Targets Facing Type of Sputtering system, according to a second embodiment of the present invention.

Referring to FIG. 14, an apparatus for making magnetic recording media according to the second embodiment is shown, which is a Targets Facing Type. The apparatus shown in FIG. 14 is very similar to that shown in FIG. 9, but further provided with a heating means in the can rollers and an additional shield to the first can roller for forming the seed layer.

Figure 15:
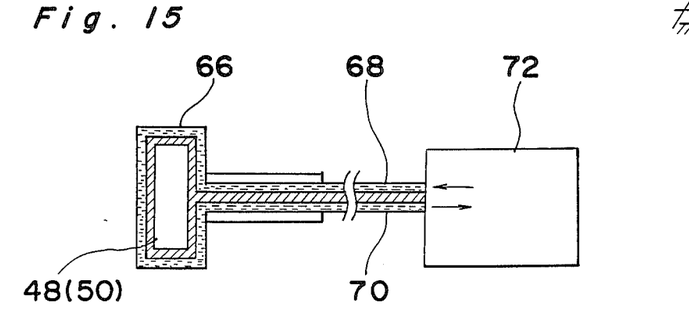
FIG. 15 is a cross-sectional view taken along a line XV—XV shown in FIG. 14.

As shown in FIG. 15, each can roller is provided with a heater which is defined by a heating unit 66 provided on the outside of the can roller and a pump 72. Pump 72 and each can roller are connected by an inlet conduit 68 and an outlet conduit 70, so as to provide a fluid, such as hot water or hot oil to the heating unit. By controlling the fluid temperature, the temperature of the can rollers can be controlled individually.

Also, according to the apparatus of FIG. 14, shield 64 is provided, extending from the axis AX towards the downstream side of the tape movement. Shield 64 prevents a further bombardment of the atoms so as to prevent the substrate from being heated in the first step.

Third Embodiment

The third embodiment of the present invention will be described in connection with FIGS. 16-22.

In the first and second embodiments, the deposition processes carried out in the first and second steps to form the seed layer and the extended layer are both done by the sputtering. Although the film deposition formed by the sputtering process is superior from the viewpoint of obtaining high residual magnetization ratio MV/MH (FIG. 16) and the perpendicular coercivity Hcv (FIG. 17), the problem is in the slow deposition rate. In the third embodiment, the first step to form the seed layer is done by the sputtering, but the second step to form the extended layer is done by an another dry deposition process, such as a vacuum deposition or an ion plating.

First, the description is directed to the experiments carried out by the present inventors to introduce the basic idea of the third embodiment.

Experiment 4

A relationship between the residual magnetization ratio MV/MH of the Co-Cr film deposited on the polyimide substrate and the substrate temperature is obtained through Experiment 4. The tests are carried out through the Targets Facing Type of Sputtering system of FIG. 2 and through the vacuum deposition system of FIG. 3. The result of this Experiment is shown in a graph of FIG. 16 in which the solid line represents the sputtering deposition and the dotted line represents the vacuum deposition.

Also, a relationship between the perpendicular coercivity Hcv and the substrate temperature is obtained through the Targets Facing Type of Sputtering system of FIG. 2 and through the vacuum deposition system of FIG. 3. The result of this experiment is shown in FIG. 17 in which the solid line represents the sputtering deposition and the dotted line represents the vacuum deposition.

Figure 16:
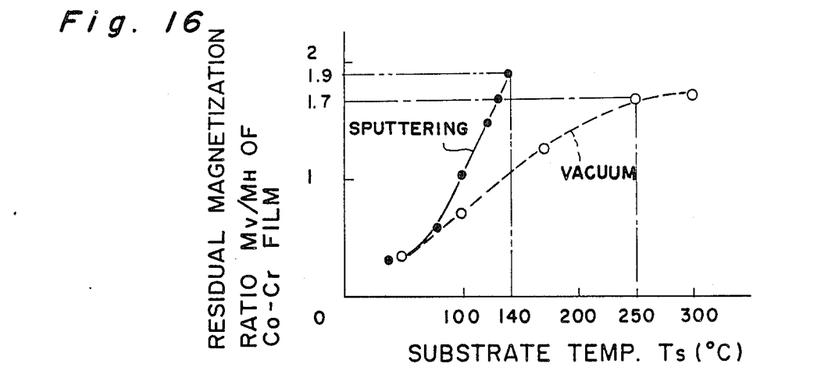
FIG. 16 is a graph showing a relationship between the residual magnetization ratio MV/MH of the Co-Cr film and the temperature of the substrate.
Figure 17:
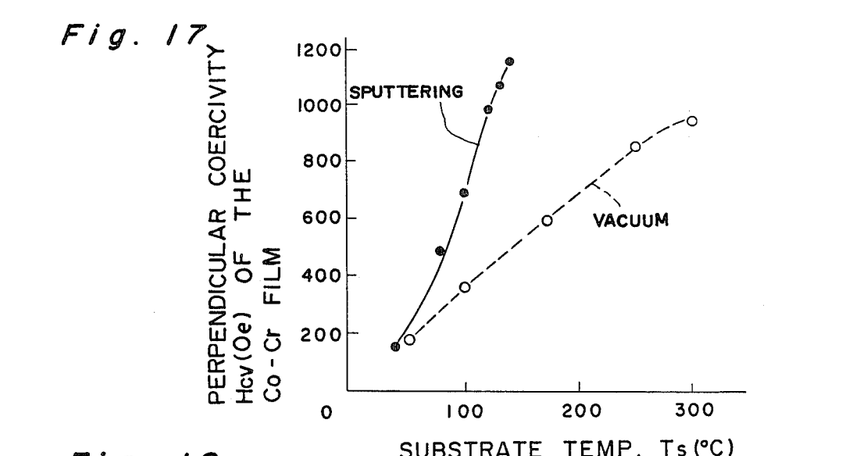
FIG. 17 is a graph showing a relationship between the perpendicular coercivity Hcv of the Co-Cr film and the temperature of the substrate.
Figure 18:
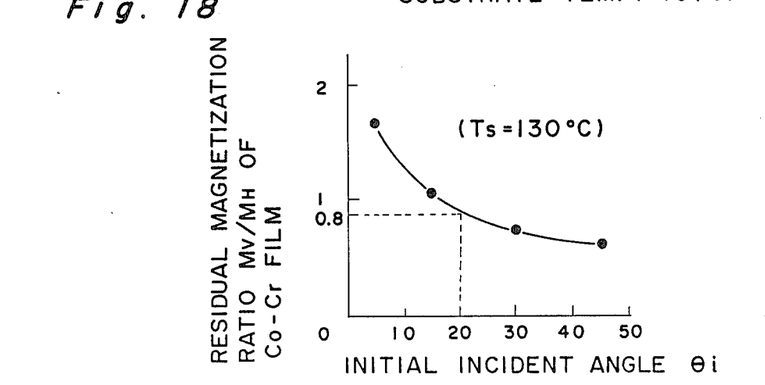
FIG. 18 is a graph showing a relationship between the residual magnetization ratio MV/MH and the initial incident angle $\theta i$ at the substrate temperature 130° C.
Figure 19:
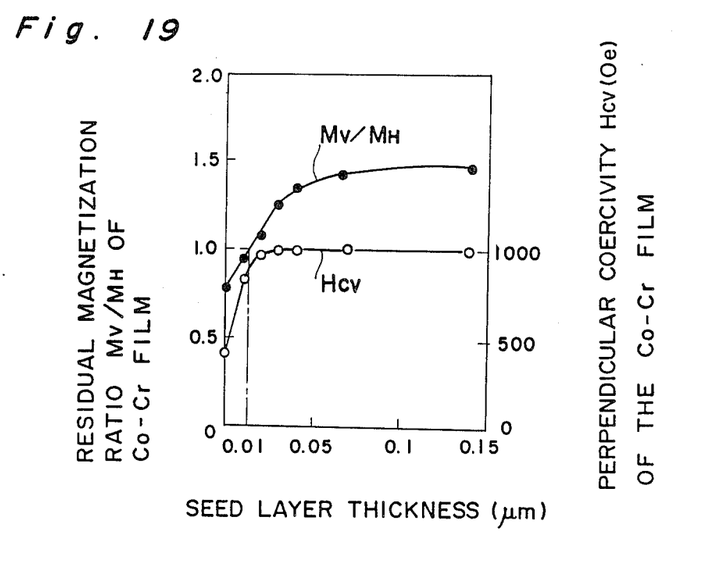
FIG. 19 is a graph showing a relationship between the residual magnetization ratio MV/MH of the Co-Cr film and the seed layer thickness, and also a relationship between the perpendicular coercivity Hcv of the Co-Cr film and the seed layer thickness.

As apparent from the graphs of FIGS. 16 and 17, the residual magnetization ratio MV/MH increases as the increase of the substrate temperature. However, in the vacuum deposition system it is necessary to increase the substrate temperature to about 250° C. to obtain the MV/MH ratio of 1.7. Whereas, in the sputtering system, it is necessary to increase the substrate temperature to about 140° C. to obtain the MV/MH ratio of 1.9. A similar thing can be said to the perpendicular coercivity Hcv.

Furthermore, a test similar to that carried in Experiment 1 is carried out, but making the substrate temperature 130° C. This test also indicates that, in order to obtain the residual magnetization ratio MV/MH greater than 0.8, the initial incident angle $\theta i$ should be about 20° or narrower. It is also approved through the test that the perpendicular coercivity Hcv has no dependency on the initial incident angle $\theta i$.

From another test, under the sputtering system the growth of the film in thickness showed 1.5 micrometers per minute, whereas that under the vacuum deposition system showed 24 micrometers per minute.

Fundamental Idea of the Third Embodiment

According to the third embodiment of the present invention, in the first step, the seed layer is formed through the sputtering system, and in the second step, the extended layer is formed, over the seed layer by the self-epitaxial growth, through a dry deposition system other than the sputtering, e.g., vacuum deposition system or ion plating system.

According to the third embodiment of the present invention, the seed layer should have a thickness greater than 0.01 micrometer. This is determined by the test explained below.

The test is carried out using a heat resistance film such as polyamide or polyimide film. In the first step, the seed layer is formed through the sputtering process with the substrate temperature Ts(1) maintained at 120° C., and the initial incident angle $\theta i$ is set at 5°. In the second step, the extended layer is formed through the vacuum deposition process with the substrate temperature Ts(2) maintained at 90° C. In the test, the thickness of the seed layer is varied, but the total thickness of the Co-Cr film is maintained at 0.3 micrometer. It has been found that, when the seed layer thickness is equal to about 0.01 micrometer or greater, as understood from the graph of FIG. 19, the residual magnetization ratio MV/MH showed 0.8 or greater, and at the same time, the perpendicular coercivity Hcv of the Co-Cr film showed 700 oersted or greater. Therefore, the seed layer must be about 0.01 micrometer or thicker.

Also, according to the third embodiment of the present invention, the extended layer should be formed under the temperature higher than 40° C. This is determined by the test explained below.

Figure 20:
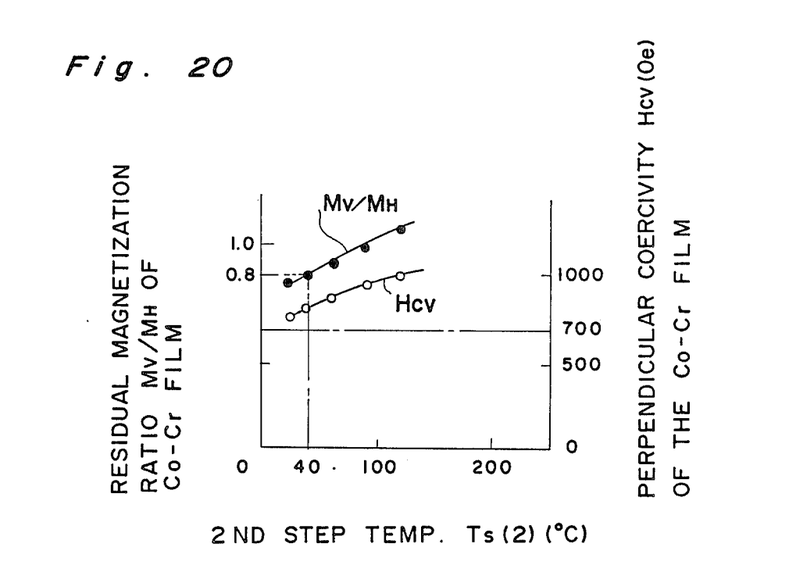
FIG. 20 is a graph showing a relationship between the residual magnetization ratio MV/MH of the Co-Cr film and the temperature of the film in the second step, and also a relationship between the perpendicular coercivity Hcv of the Co-Cr film and the temperature of the film in the second step.

For this test, a low heat resistance film such as a PET film is used. In the first step, the seed layer is formed through the sputtering process with the substrate temperature Ts(1) maintained at 120° C., and the initial incident angle $\theta i$ is set at 5° with the thickness of the seed layer being 0.02 micrometer. In the second step, the extended layer is formed through the vacuum deposition process until the thickness of the completed Co-Cr film is made equal to about 0.3 micrometer. In the test, the temperature of the substrate in the second step is changed, and the result is shown in FIG. 20. As apparent from the graph of FIG. 20, as the temperature in the second step increases, the perpendicular coercivity Hcv of the Co-Cr film increases, as well as the residual magnetization ratio MV/MH. To obtain the perpendicular coercivity Hcv of the Co-Cr film greater than 700 oersted, and the residual magnetization ratio MV/MH greater than 0.8, the temperature Ts(2) in the second step should be greater than 40° C. The upper temperature limit for effecting the deposition is 70° C. so as to prevent the plastic film from being damaged. In the case where the extended layer is deposited by the vacuum deposition system, the upper temperature limit may be increased to 100° C.

Apparatus of the Third Embodiment

Figure 21:
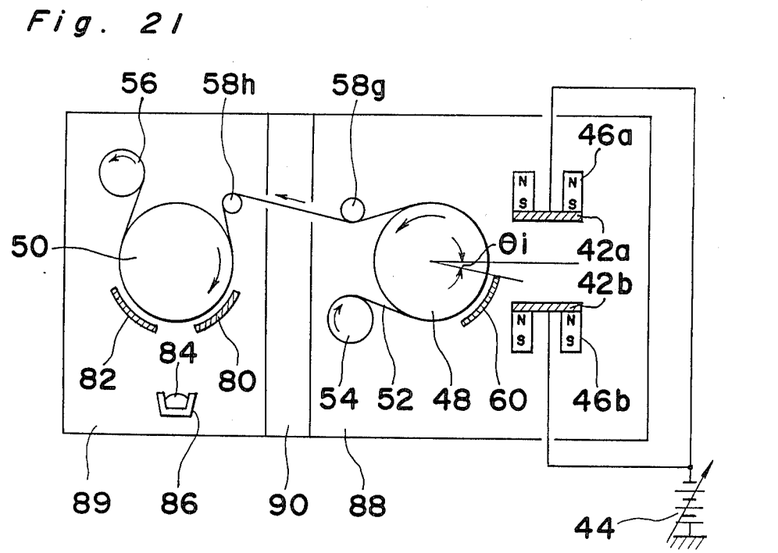
FIG. 21 is a diagrammatic view of an apparatus for making magnetic recording tapes through the Targets Facing Type of Sputtering system and then through the vacuum deposition system, according to a third embodiment of the present invention.

Referring to FIG. 21, an apparatus for making magnetic recording media according to the third embodiment is shown.

The apparatus comprises an air tight chamber 88 in which the sputtering process is carried out for forming the seed layer, and another air tight chamber 89 in which the vacuum deposition process is carried out for forming the extended layer. Provided between chambers 88 and 89 is a separation chamber 90 which is also made air tight so as to maintain the vacuum pressure in chambers 88 and 89 at the required level.

Provided inside chamber 88 is the atomic-particles generating means defined by targets 42a and 42b, permanent magnets 46a and 46b and battery 44. Which are arranged in the same manner as in the previous embodiments.

A substrate, such as a plastic tape 52, is wound on a supply reel 54 and extends to a take-up reel 56. A tape portion between reels 54 and 56 extends around can roller 48, through separation chamber 90, and again around can roller 50. By a suitable driving means (not shown), the substrate tape moves from supply reel 54 to take-up reel 56 in the direction indicatd by arrows. Guide rollers 58g and 58h are provided to guide the tape through the separation chamber.

Provided inside chamber 89 is another atomic-particles generating means defined by a Co-Cr alloy ingot 84 contained in a plate 86. The ingot is heated by a suitable heating means, such as an electronic beam, so as to evaporate the Co-Cr alloy in chamber 89. The Co-Cr vapor is deposited on the tape 52 stretched around can roller 50. Suitable shields 80 and 82 are provided to control the deposition rate of the atomic particles on the substrate.

In operation, first, the pressure inside chambers 88, 89 and 90 is pumped down to $1 \times 10^{-6}$ Torr, and thereafter, argon gas is past into chamber 88 through a port (not shown) until the pressure inside the chamber increases to $2 \times 10^{-3}$ Torr. Then, can rollers 48 and 50 are heated, by a suitable heating means to 120° C. and 90° C., respectively. Substrate 52 is advanced at a speed 4.5 m/min.

Then, in chamber 88, when a high negative voltage from source 44 is applied to targets 42a and 42b with the sputtering power density at 38 W/cm$^2$, argon gas is ionized to produce a plasma discharge which is confined between targets 42b and 42a by the magnets 46b and 46a, thereby effecting the deposition of the atomic particles in the sputtering method.

Next, in chamber 89, ingot 84 is heated by applying an electric power (9 kW) to the electronic beam to effect the vacuum deposition.

Thus, the Co-Cr film formed by the apparatus of the third embodiment has required levels of residual magnetization ratio MV/MH (such as 1.0) and perpendicular coercivity Hcv (such as 950 oersted). Also, since the film advance speed is much faster than the previous embodiments, the productivity is improved greatly without deteriorating the quality of the magnetic tape.

Figure 22:
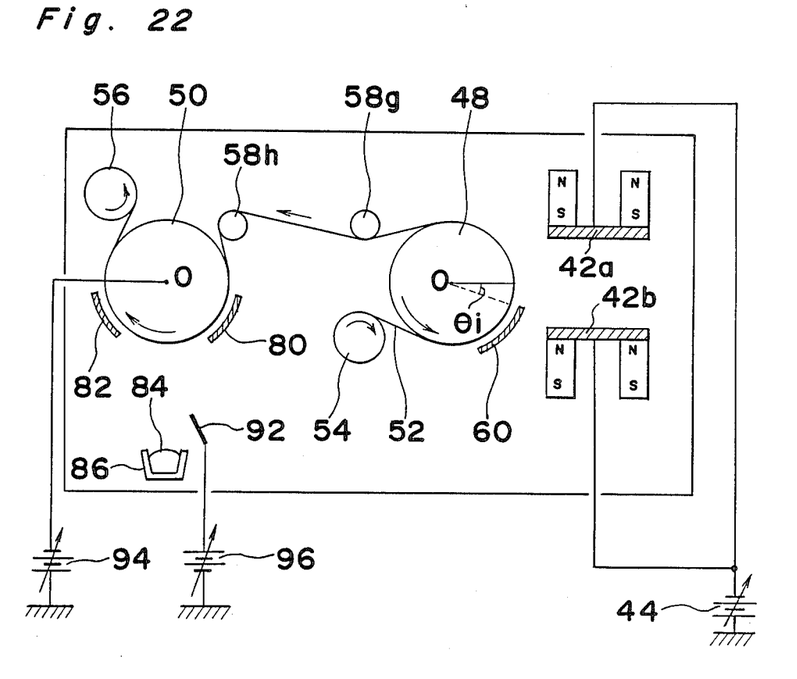
FIG. 22 is a diagrammatic view of an apparatus for making magnetic recording tapes through the Targets Facing Type of Sputtering system and then through the ion plating system, according to a modification of the third embodiment of the present invention.

Referring to FIG. 22, a modification of the third embodiment is shown, in which, instead of the vacuum deposition, the ion plating is employed for making the extended layer. In the apparatus shown, the second atomic-particles generating means is defined by an ionization electrode 92 located above ingot 84. Ionization electrode 92 is connected to an ionization power source 96, and can roller 50 is connected to an acceleration power source 94, which may be replaced with an RF source. By the ionization electrode, the electrons are derived from the vaporized Co and Cr atoms, thereby making the Co and Cr ions. Power source 94 is provided to attract and accelerate the speed of the Co and Cr ions directed towards the can roller 50.

Instead of depositing the Co-Cr film, the apparatus according to the present invention may be used to deposit Co-Cr-Rh film. Also, although the apparatus according to the present invention is suitable for making the perpendicular magnetic recording tapes, other recording media can be made. In such a case, the initial incident angle for making the seed layer may not be at 5°, but any arbitrary angle, such as 45°. Furthermore, the tape may be previously deposited with a high magnetic permeability film such as Ni-Fe film, thereby forming a double layer film of different material.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A method for making magnetic recording media comprising the steps of:
   a first depositing step for depositing, through a sputtering process, a seed layer defined by crystalline columns of magnetic material densely and perpendicularly formed on a substrate at a first deposition station; and
   a second depositing step for depositing an extended layer defined by extended crystalline columns over said crystalline columns of said seed layer through self-epitaxial growth at a second deposition stations, wherein;
   (a) the second deposition step is carried out by the use of a vacuum deposition technique,
   (b) the initial incident angle employed during the performance of the sputtering process referred to in the first deposition step, is smaller than 20° and, a shield is used to define the particular angle,
   (c) both of the seed layer and the extended layer are formed of the same ferromagnetic metal.

2. A method as claimed in claim 1, wherein said seed layer is deposited with an initial incident angle of 5°.

3. A method as claimed in claim 1, wherein said extended layer is deposited with an initial incident angle greater than that arranged for depositing said seed layer.

4. A method as claimed in claim 1, wherein said seed layer has a thickness about 0.01 micrometer or greater.

5. A method as claimed in claim 1, wherein the combined thickness of said seed layer and said extended layer is about 0.3 micrometer.

6. A method as claimed in claim 1, wherein said substrate is made of a PET tape.

7. A method as claimed in claim 1, wherein said substrate is made of an polyamide tape.

8. A method as claimed in claim 1, wherein said substrate is made of an polyimide tape.

9. A method as claimed in claim 1, wherein said seed layer is deposited on said substrate which is heated to 100° C. to 120° C.

10. A method as claimed in claim 1, wherein said extended layer is deposited on said substrate which is heated to 40° C. to 70° C.

11. A method as claimed in claim 1, wherein said first depositing step is carried out by a targets facing sputtering system.

12. A method as claimed in claim 1, wherein said first depositing step is carried out by a magnetron sputtering system.

13. A method as claimed in claim 1, wherein said second depositing step is carried out by a targets facing sputtering system.

14. A method as claimed in claim 1, wherein said second depositing step is carried out by a magnetron sputtering system.

15. A method as claimed in claim 1, wherein said second depositing step is carried out by a dry deposition system other than sputtering.

16. A method as claimed in claim 1, wherein said second depositing step is carried out by an ion plating deposition system.

* * * * *